United States Patent [19]
Ishaya et al.

[11] Patent Number: 5,826,754
[45] Date of Patent: Oct. 27, 1998

[54] BULK DISPENSER FOR COMESTIBLES

[75] Inventors: Romeo M. Ishaya, Glenview; Steven J. Danemayer, Oak Park, both of Ill.

[73] Assignee: General Mills, Inc., Minneapolis, Minn.

[21] Appl. No.: 660,956

[22] Filed: Jun. 10, 1996

[51] Int. Cl.$^6$ ....................................................... B67D 5/06
[52] U.S. Cl. ........................................ 222/185.1; 222/413
[58] Field of Search .............................. 222/181.1, 185.1, 222/412, 413

[56] References Cited

U.S. PATENT DOCUMENTS

| | | | |
|---|---|---|---|
| 2,410,410 | 11/1946 | Garubo | 222/505 X |
| 2,593,803 | 4/1952 | Schofield | 222/413 X |
| 4,176,767 | 12/1979 | Franche, IV | 222/243 |
| 4,448,331 | 5/1984 | Millette et al. | 222/185.1 |
| 4,562,941 | 1/1986 | Sanfilippo | 222/181 X |
| 4,569,463 | 2/1986 | Pellegrino | 222/187 |
| 4,619,379 | 10/1986 | Biehl | 222/153 |
| 4,790,457 | 12/1988 | Morse et al. | 222/185 |
| 4,802,609 | 2/1989 | Morse et al. | 222/158 |
| 4,997,109 | 3/1991 | Carper | 222/146.6 |
| 5,054,657 | 10/1991 | Morse et al. | 222/162 |
| 5,139,173 | 8/1992 | Evinger | 222/185.1 |
| 5,222,634 | 6/1993 | Hayes | 222/181 |
| 5,437,393 | 8/1995 | Blicher et al. | 222/185.1 |

FOREIGN PATENT DOCUMENTS

| 350615 | 9/1905 | France | 222/413 |
|---|---|---|---|

OTHER PUBLICATIONS

Kellogg's® Bulk Dispenser Upgrade Kit, Kellogg Company FSD32890G ©1994.

*Primary Examiner*—Joseph Kaufman
*Attorney, Agent, or Firm*—John A. T'Toole; L. MeRoy Lillehaugen; Alan D. Kamrath

[57] ABSTRACT

A bulk dispenser (10) having particular application for dispensing ready-to-eat cereals is disclosed generally including a stand (12), a dispenser unit (14) and a storage bin (16). A door assembly (74) is pivotally mounted to the dispenser unit (14) and includes a counterweight (80) fixed to and for biasing a door (76) to its closed position closing the discharge opening of the dispenser unit (14). The door (76) is moved from its closed position by pushing against the arcuate portion (92) of a pusher tongue (88). The free end of the pusher tongue (88) moves through an arcuate groove (98) formed in the base (94) of the stand (12) when the door (76) pivots about its axis. The bottom (22) of the storage bin (16) has a curvilinear shape to prevent bridging of the cereal over its lower aperture (26) preventing passage of the cereal into the dispensing unit (14). The cereal is dispensed by the rotation of an auger (54) including a flight (62) of the continuous screw type and having an outer periphery of a decreasing diameter and engaging a trough (52) of the discharge unit (14) sloping downward from the horizontal from the discharge opening to the rear wall (40). Excessive forward flowing of the cereal to the bowl is thus prevented while reducing the amount of product fines generated by working the bulk dispenser (10).

17 Claims, 3 Drawing Sheets

BULK DISPENSER FOR COMESTIBLES

BACKGROUND

The present invention generally relates to bulk dispensers for comestibles, particularly to bulk dispensers for ready-to-eat cereals, and specifically to bulk dispensers for comestibles which minimize the generation of product fines due to product breakage and rough handling.

Conventionally, ready-to-eat cereal was dispensed in bulk form at dormitories and other commercial institutions from slide type dispensers. However, such dispensers dispensed only one volume amount which could be too little or too much for the particular person. Further, such dispensers generated considerable breakage of the product in ranges of up to 17% of the total product dispensed.

Thus, a need exists for cereal dispensers which allow dispensing of variable volume amounts of cereal and which do not generate product breakage and in particular generate product breakage of less than 1% of the total product dispensed. In this regard, bulk dispensers including auger type feeds have been known especially for hard, not easily broken pieces such as coffee beans, hard candies, nuts in their shells, and the like. Although bulk dispensers of more fragile products such as ready-to-eat cereal utilizing auger type feeds have been developed, there continues to be a need for improved, auger type bulk dispensers which minimize the generation of product fines due to product breakage and rough handling, which are of a simpler design less costly to manufacture, and which are easier to operate with less spillage.

SUMMARY

The present invention solves this need and other problems in the field of dispensing comestibles stored in bulk by providing, in the preferred form, a door pivotably mounted to a dispenser unit and for closing the discharge opening thereof, with a counterweight being fixed to the door on the opposite side of its pivot axis than the discharge opening for biasing the door to pivot about its pivot axis to its closed position.

In further aspects of the present invention, a door is pivotably mounted to a dispenser unit and for closing the discharge opening thereof, with a pusher tongue being fixed to and extending from the door on the same side of the pivot axis as the discharge opening. In preferred forms, the pusher tongue adjacent its free end extends in a direction away from the door but towards the axis, with the pusher tongue including an arcuate portion including the free end in the most preferred form. Also, in preferred forms, the free end of the pusher tongue moves through an arcuate groove formed in the base of a stand for supporting the dispenser unit.

In other aspects of the present invention, the bottom of the storage bin has a continuously decreasing vertical spacing from the lower aperture as the bottom extends from the front wall towards the lower aperture to assist in preventing bridging of the comestibles over the lower aperture.

In still other aspects of the present invention, an auger is rotatably mounted in the dispenser unit including a flight of the continuous screw type having an outer periphery of a decreasing diameter and engaging a trough sloping downward from the horizontal from the discharge opening to the back wall to prevent excessive forward flowing of the comestibles while reducing the amount of product fines generated by working the bulk dispenser.

These and further aspects and advantages of the present invention will become clearer in light of the following detailed description or an illustrative embodiment or this invention described in connection with the drawings.

DESCRIPTION OF THE DRAWINGS

The illustrative embodiment may best be described by reference to the accompanying drawings where:

FIG. 4 shows a partial, cross-sectional view of the bulk dispenser of FIG. 1 according to section line 4—4 of FIG. 1.

Figure 1:
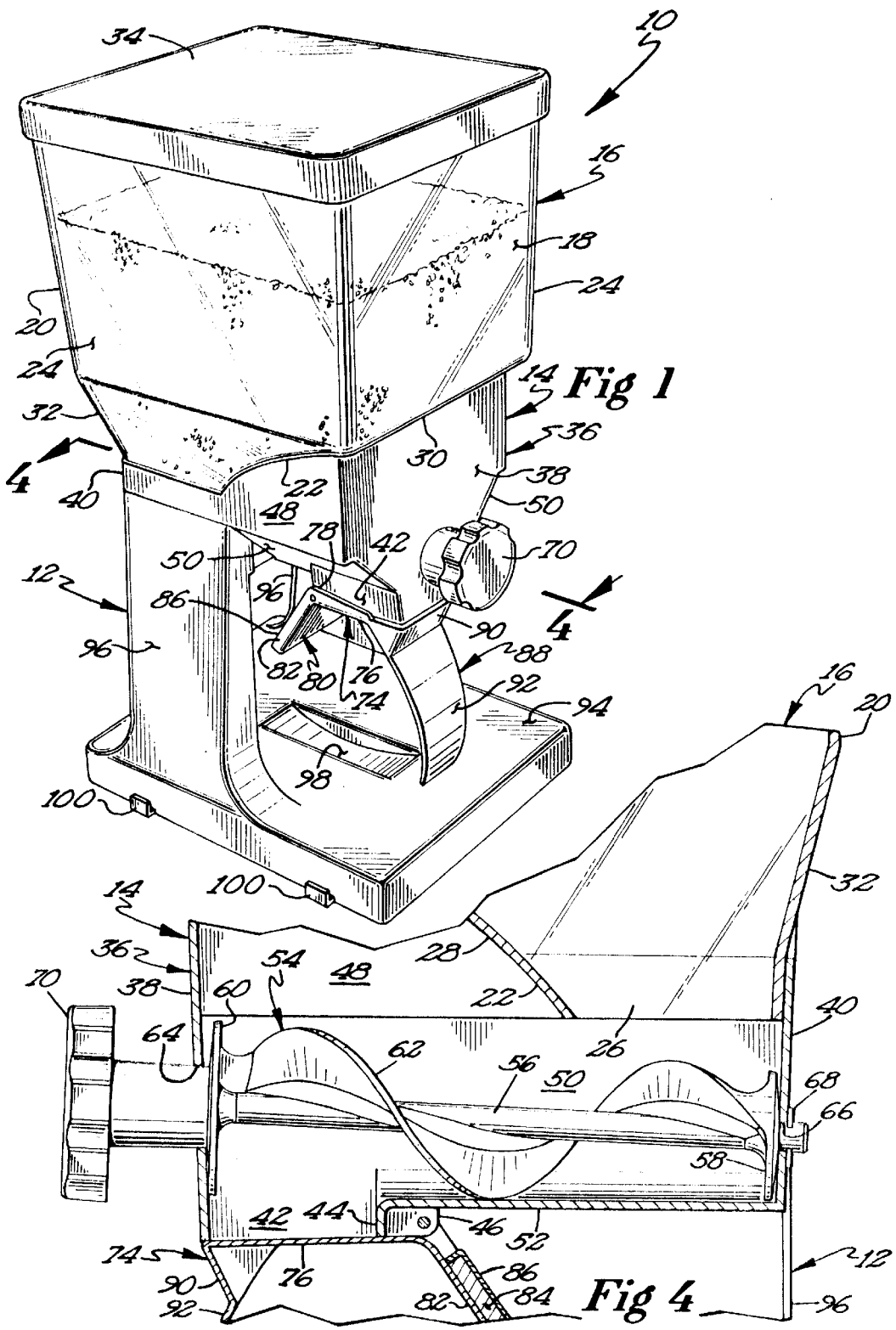
FIG. 1 shows a perspective view of a bulk dispenser for comestibles and especially ready-to-eat cereals according to the preferred teachings of the present invention.
Figure 2:
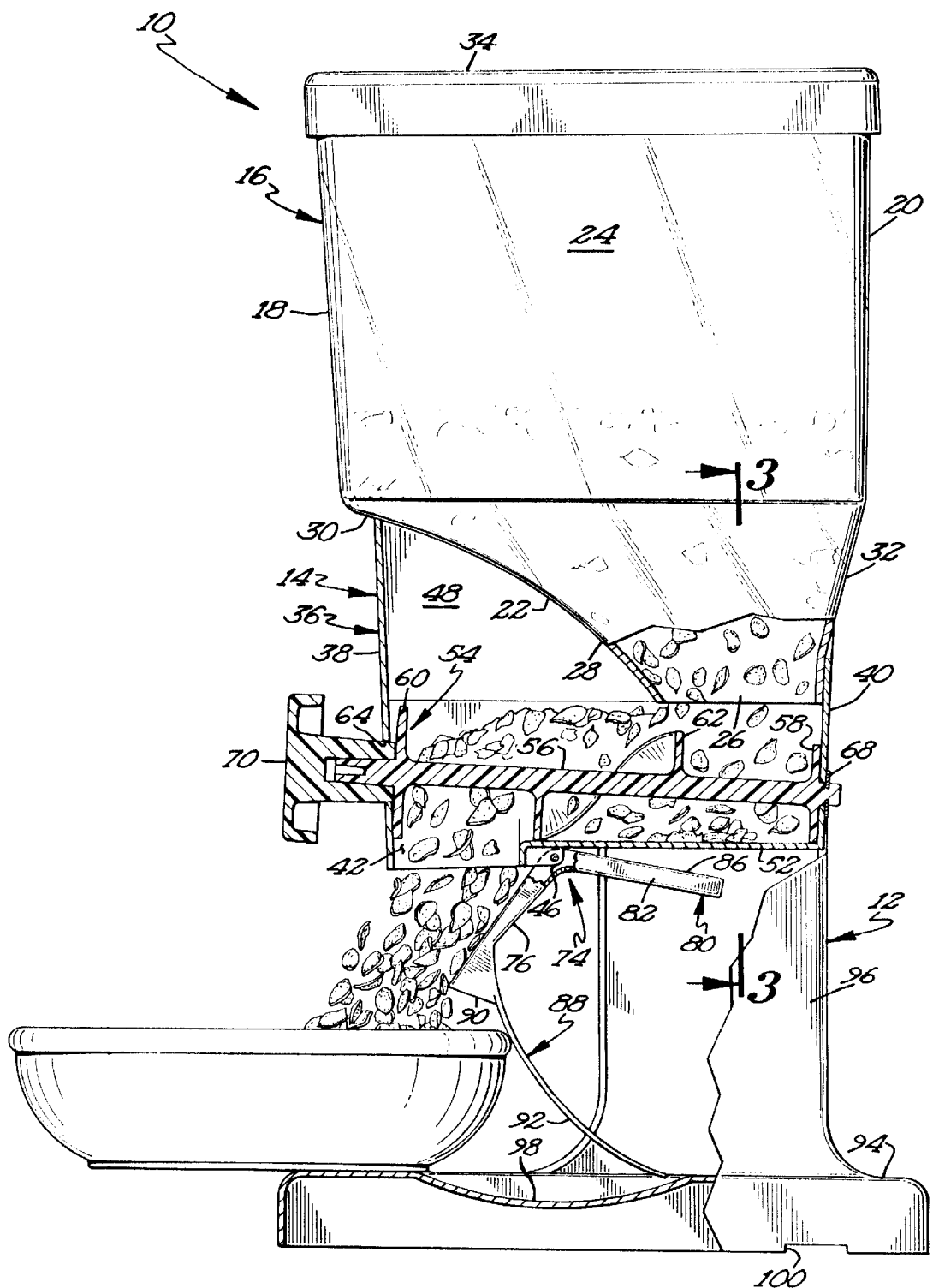
FIG. 2 shows a side view of the bulk dispenser of FIG. 1, with portions broken away to show internal construction.
Figure 3:
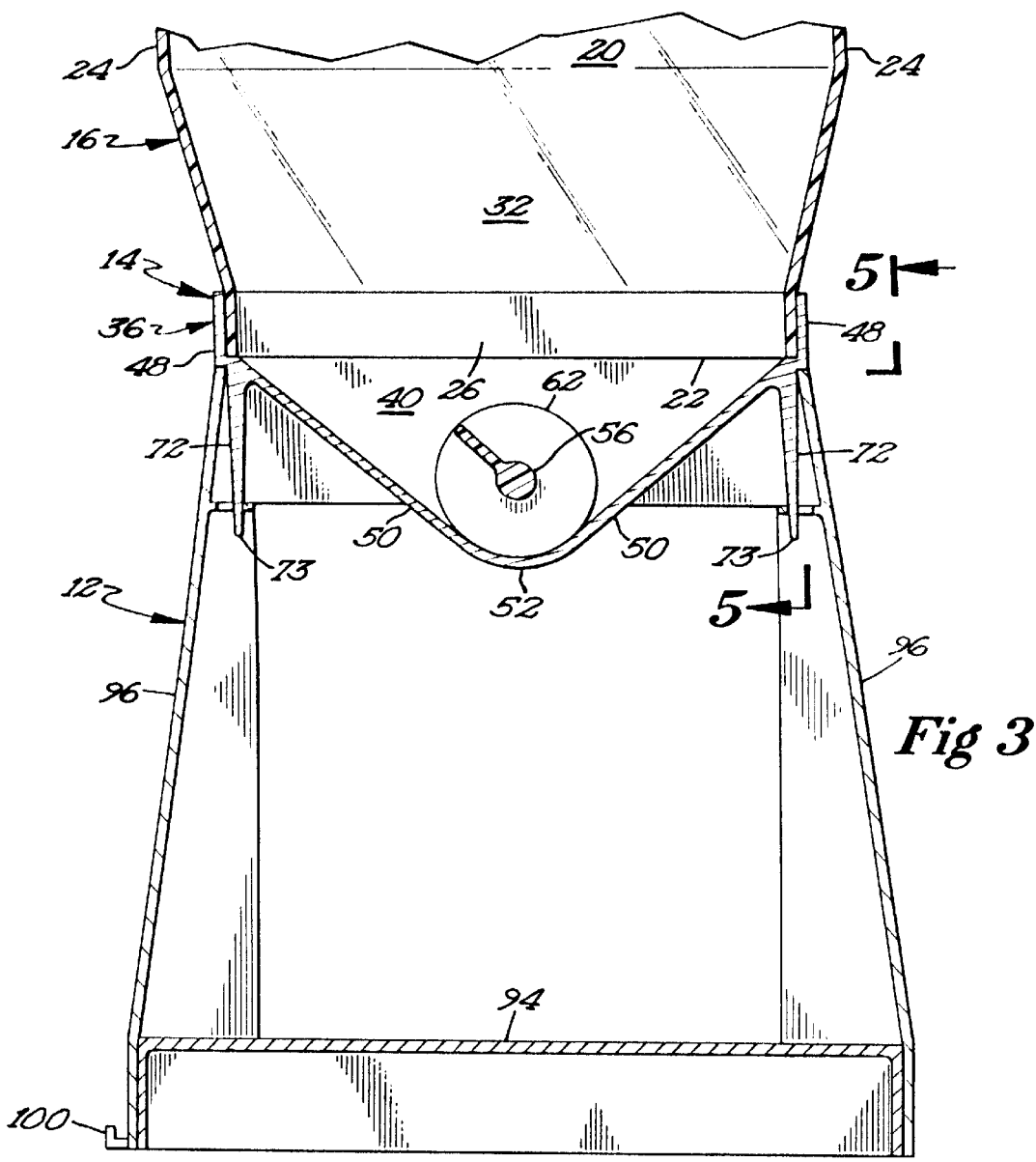
FIG. 3 shows a partial, cross-sectional view of the bulk dispenser of FIG. 1 according to section line 3—3 of FIG. 2.
Figure 5:
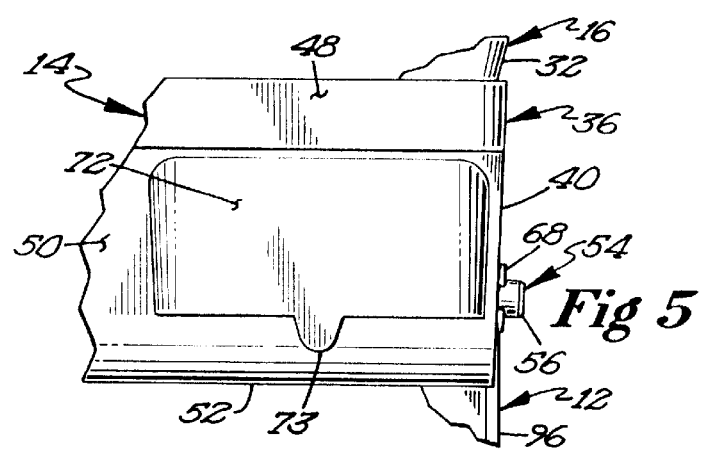
FIG. 5 shows a partial, cross-sectional view of the bulk dispenser of FIG. 1 according to section line 5—5 of FIG. 3.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "inside", "outside", "front", "back", "outer", "inner", "upper", "lower", "height", "width", "length", "end", "side", "horizontal", "vertical", "axial", "radial", "longitudinal", "lateral", and similar terms are used herein, it should be understood that these terms have reference only to the structure shown in the drawings as it would appear to a person viewing the drawings and are utilized only to facilitate describing the illustrative embodiment.

DESCRIPTION

A bulk dispenser for comestibles according to the preferred teachings of the present invention is shown in the drawings and generally designated 10 and in the most preferred form is of the type shown and described in U.S. Pat. No. Des. 384,863 and U.S. design patent application Ser. No. 29/063,766 filed Dec. 21, 1996 which is hereby incorporated herein by reference. In the most preferred form, dispenser 10 has particular application for dispensing ready-to-eat cereals including but not limited to flake and puffed products and in particular for dispensing such cereals without generation of cereal fines and similar piece breakage. However, it should be appreciated that dispenser 10 according to the teachings of the present invention can be utilized to dispense other forms of comestibles including but not limited to corn chips, croutons, and the like.

Generally, dispenser 10 according to the preferred teachings of the present invention includes a stand 12 and a dispenser unit 14. In the preferred form, dispenser unit 14 generally includes a storage bin 16 for holding the comestible desired to be dispensed. Specifically, bin 16 includes a front wall 18, a back wall 20, a bottom 22 extending from the lower edge of front wall 18 towards but spaced from the lower edge of back wall 20, and first and second side walls 24 extending between the first and second sides of front and back walls 18 and 20 and extending vertically upward from the first and second sides of bottom 22. A lower aperture 26 is thus formed and defined by bottom 22, back wall 20, and side walls 26 and located between bottom 22 and back wall 20. Bottom 22 has a continuously decreasing vertical spacing from stand 12 as it extends from front wail 18 towards back wall 20 and in the most preferred form has a curvilinear relation with increasing spacing from front wall 18 rather than a straight linear or sloped relation. In the most preferred form, bottom 22 generally includes a first portion 28 extending from aperture 26 towards but spaced from front wall 18 of an arcuate shape and a second portion 30 of a generally planar nature extending at an obtuse angle from front wall 18 in the order of 108°. Portion 30 extends about 30% of the horizontal spacing between aperture 26 and back wall 20. Front wall 18 can have any desired shape such as planar or arcuate between side walls 24. Back wall 20 can extend generally vertically upward from aperture 26 or can be horizontally offset rearwardly of aperture 26 and can have any desired shape such as planar between side walls 24. In the most preferred form of the present invention, back wall 20 at least within the same vertical extent as bottom 22 includes a portion 32 having a continuously increasing horizontal offset from aperture 26 such as a linear slope in the order of 15° to the vertical of the most preferred form. Bin 16 in the preferred form includes a removable cover 34 for closing the open upper ends of walls 18, 20, and 24.

It should be appreciated that in prior dispensers, product tended to cave or tunnel in the center of the storage bin and form a bridge of product over the bin outlet. Thus, prior dispensers often required agitators to break up such product bridges over the bin outlet to allow dispensing of the product. However, storage bin 16 according to the teachings of the present invention and in particular including the curvilinear bottom 22 of the most preferred form better controls the flow of the comestibles and especially flaked products to generally prevent bridging of aperture 26. Thus, dispenser 10 according to the teachings of the present invention does not require the use of an agitator as in prior dispensers and thereby reducing its complexity and cost from prior dispensers.

Dispenser unit 14 further generally includes an auger housing 36 having a suitable interfitting relation with storage bin 16. In the preferred form, housing 36 generally includes a front wall 38 and a rear wall 40 of a generally planar shape. A discharge opening is formed by first and second opening sides 42 extending rearwardly generally perpendicular to front wall 38 and an opening back 44 extending generally perpendicular between sides 42. In the most preferred from, sides 42 extend rearwardly beyond back 44 to define pivot ears 46.

Housing 36 includes an upper portion defined by first and second side walls 48 extending generally perpendicular between walls 38 and 40. The lower edges of side walls 48 are generally horizontally arranged. The upper edges of the upper portion of housing 36 defined by walls 38, 40, and 48 are of a shape and size for receiving and supporting storage bin 16. It should be appreciated that the upper edges of walls 38, 40 and 48 are open for receiving comestibles from aperture 26 of storage bin 16.

Housing 36 further includes a lower portion defined by first and second planar bottom walls 50 extending at an obtuse angle in the order of 135° from the lower edge of side walls 48. In the most preferred form, shoulders are formed at the interconnection of bottom walls 50 to the side walls 48. The front and rear edges of bottom walls 50 integrally terminate in front and rear walls 38 and 40, respectively. The lower edges of bottom walls 50 integrally terminate in the upper edges of opening sides 42 to the rearward extent of the discharge opening. The lower portion of housing 36 further includes a trough 52 having an arcuate shape with the lower edges of bottom walls 50 integrally extending generally tangentially from the upper edges of trough 52. The rear edges of trough 52 integrally terminate in rear wall 40 and the front edges of trough 52 integrally terminate in opening back 44.

In the most preferred form, the bottom of trough 52 slopes downwardly at a very small angle to the horizontal in the range of about 1° to 3° and in the most preferred form at an angle in the order of 2° from opening back 44 to rear wall 40. The back slope of trough 52 is provided to prevent excessive forward flowing of the comestibles which is important for puffed products but less so for flaked products.

Dispenser unit 14 further includes an auger 54 having a central shaft 56. First and second annular members 58 and 60 are integrally secured generally perpendicular to shaft 56 adjacent to but spaced inwardly from the free ends thereof. The diameter of member 58 is less than the diameter of member 60. Auger 54 further includes a flight 62 of the continuous screw type secured to shaft 56 and extending between members 58 and 60 at a pitch of 4.574. It should be appreciated that too small of pitch results in product breakage and too large of pitch would make dispensing difficult and require considerable rotation for dispensing the desired volume amount of comestibles. In the preferred form, flight 62 has a decreasing diameter from member 60 to member 58 and in the most preferred form, has an outer periphery which decreases at an angle in the order of 2.5° from member 60 to member 58. This configuration of flight 62 is especially useful in minimizing the breakage of the comestibles being dispensed whether of the flaked, puffed, or other type. Auger 54 is mounted in housing 36 by extending auger 54 through an aperture 64 formed in front wall 38 having a size generally equal to and for rotatably receiving annular member 60. An aperture 66 is formed in rear wall 40 of a size generally equal to and for rotatably receiving shaft 56, with annular member 58 generally abutting with rear wall 40. In the preferred form, auger 54 is held against removal by a spring clip 68 received on shaft 56 on the opposite side of wall 40 than annular member 58.

The outer periphery of flight 62 should generally engage with the bottom of trough 52 and extend over the discharge opening of housing 36. In the preferred form, flight 62 is fabricated for rotation in a single direction which is clockwise when facing front wall 38 and in fact is not able to rotate in the opposite direction when comestibles are located in storage bin 16 even though auger 54 does not include a twist stop of any kind. Auger 54 includes a knob 70 for slideable receipt on the free end of shaft 56 adjacent member 60. Knob 70 allows auger 54 to be easily manually rotated and may be utilized for assisting the rotatable mounting of auger 54 in aperture 64. The discharge opening of housing 36 is sized according to the teachings of the present invention to prevent product breakage and specifically to allow the comestibles to be removed from auger 54 faster than delivered by auger 54 but slow enough to avoid spillage.

In the most preferred form, the lower portion of housing 36 includes generally U-shaped mounting bosses 72 integrally formed and extending outwardly from bottom walls 50. Generally, bosses 72 include planar central portions extending generally parallel to but spaced inwardly from side walls 48 and leg portions extending generally perpendicular from the opposite edges of the central portions. In the most preferred form, the lower edges of bosses 72 are generally horizontally arranged parallel to but spaced below the lower edges of side walls 48. In the preferred form, the lower edges of the central portions of bosses 72 include an arcuate projection 73.

Dispenser unit 14 further includes a door assembly 74 according to the preferred teachings of the present invention. Generally, assembly 74 includes a door or closure 76 of a size and shape for abutting with the lower edges of wall 38, sides 42, and back 44 defining the discharge opening. Door 76 further includes pivot ears 78 for pivotally mounting door 76 about an axis relative to housing 36 in conjunction with pivot ears 46. Door 76 when abutting with the lower edges of and closing the discharge opening is generally horizontal.

Door assembly 74 further includes suitable provisions for biasing door 76 to its closed position and in the most preferred form includes a counterweight 80. In the most preferred form, counterweight 80 includes a counterweight reservoir 82 integrally fixed without relative movement to and extending at an obtuse angle at least equal to and preferably greater than 90° and in the most preferred form in the order of 125° to door 76. Pivot ears 78 are generally located at the intersection of reservoir 82 and door 76 such that counterweight 80 is located on the opposite side of the door pivot axis than the discharge opening of housing 36. Suitable counterweight material 84 such as stainless steel can be held in reservoir 82 such as by a reservoir cover 86.

Due to gravitational forces, the normal position of counterweight 80 would be vertically downward from the axis of door assembly 74 to housing 36. However, due to the angular relationship between door 76 and counterweight 80 being greater than 90°, door 76 will abut with and close the lower edges of the discharge opening of housing 36 and prevent counterweight 80 from reaching its vertically downward position. It can then be appreciated that counterweight 80 acts to keep door 76 in a normally closed position. The mass of counterweight 80 should be sufficient to prevent door 76 from moving from its normally closed position from the mass of the comestibles located in housing 36 in and above the discharge opening. It should therefore be appreciated that the use of a counterweight 80 is believed to be advantageous as door 76 will always be biased to its closed position and counterweight 80 will not be subject to wear as other approaches such as springs are.

Door assembly 74 further includes a pusher tongue 88 for pushing by a bowl or similar container for receiving he comestibles dispensed by dispenser 10, with tongue 88 fixed to and extending from door 76 on the opposite side of its pivot axis than counterweight 80 or in other words on the same side of the pivot axis as door 76. In particular, tongue 88 includes a first generally planar portion 90 extending at an angle in the order of 65° from the front edge of door 76 opposite counterweight 80. Tongue 88 further includes an arcuate portion 92 extending from the free edge of portion 90. Due to its arcuate shape in the most preferred form, the free edge of portion 92 of tongue 88 extends in a direction away from door 76 but towards the pivot axis of door 76. In the most preferred form, arcuate portion 92 extends approximately 85% of the distance between the edge of door 76 to which portion 90 is attached and the free edge of portion 92 opposite to door 76. Arcuate portion 92 can optionally include an instruction medallion, sticker, or indicia indicating that the bowl should be pushed against portion 92. In the most preferred form, door 76, reservoir 82 and tongue 88 are formed of a single molded plastic piece. Suitable reinforcement webs or ribs can be provided to tongue 88 and/or between tongue 88 and door 76 for increasing strength of the piece.

Stand 12 generally includes a horizontal base 94 and right and left support legs 96 attached on opposite sides of base 94. Support legs 96 include suitable provisions for attachment to housing 36 and in particular to mounting bosses 72 thereof to prevent undesired separation thereof. Support legs 96 can be constructed to provide an open passageway between legs 96, base 94, and housing 36, to provide a passageway closed or partially closed between the back of legs 96, or of other constructions. Base 94 includes a groove 98 having an arcuate bottom through which the free end of portion 92 of tongue 88 is able to rotate when door 76 is pivoted about its pivot axis. In the most preferred form, base 94 includes suitable interlocks 100 to gang a plurality of dispensers 10 in a lateral series. In the most preferred form, interlocks 100 include upstanding studs spaced slightly outwardly on one side of base 94 for receipt in complementary notches formed on the other side of base 94.

Now that the basic construction of dispenser 10 according to the preferred teachings or the present invention has been set forth, the operation and some of the many advantages of dispenser 10 can be explained. In particular, It will be assumed that dispenser 10 is at its desired location and the comestible desired to be dispensed is located in bin 16. An individual desiring such comestible would obtain a bowl or similar container and place it upon base 94 in front of tongue 88. At that time, the bowl can be pushed rearwardly to engage tongue 88 and to thereby pivot door assembly 74 against the bias of counterweight 80 and thereby move door 76 from its closed position. It should therefore be noted that due to the particular configuration of tongue 88 and in particular portion 90 extending rearwardly from the edge of door 76, any comestible located on door 76 in its closed position will fall from door 76 into the bowl and specifically will not fall onto base 94 or the counter that dispenser 10 is positioned. Thus, less waste and clean-up of comestibles occur.

The bowl can be pushed rearwardly until door assembly 74 is pivoted such that counterweight 80 engages the bottom of housing 36 outside of the discharge opening which in the most preferred form is the bottom surface of trough 52 and thus preventing further movement of door assembly 74 and thus of the bowl. In this position, the bowl is positioned directly below the discharge opening of housing 36 such that comestibles advanced by auger 54, passing through the discharge opening of housing 36 and sliding on door 76 will fall in the center of the bowl. It should therefore be appreciated that it is not necessary for the individual to attempt to use one of his hands both to open door assembly 74 and to hold and move the bowl while leaving the other hand free to operate dispenser 10.

With the bowl in position, knob 70 can be grasped by the other hand not holding the bowl and rotated to cause rotation of auger 54. Rotation of auger 54 advances comestibles falling from bin 16 through aperture 26 to the discharge opening of housing 36 and into the bowl. When the desired amount of comestibles has been dispensed, knob 70 can be released such that rotation of auger 54 stops. The bowl can then be slid rearwardly upon base 94 to thereby release pressure on tongue 88. As the bowl is slid rearwardly, door assembly 74 will pivot due to counterweight 80 towards the closed position of door 76. Again, the preferred shape of tongue 88 helps to insure that any comestible falling through the discharge opening of housing 36 will land in the bowl even when the bowl is being slid from dispenser 10. Before the bowl is removed from base 94, door 76 will reach its closed position to prevent any further comestibles from being dispensed through the discharge opening of housing 36.

It can therefore be appreciated that it is not necessary for an individual to attempt to hold open door assembly to the discharge opening with one hand while simultaneously with the same hand hold the bowl from movement on the base as the result of movement of the dispenser due to the opening of the discharge door and/or as the result of the manual operation of the dispensing unit such as an auger 54 as in the present invention. The hand which slides and holds the bowl in dispenser 10 of the present invention is not required to manipulate the door assembly 74 as in prior dispensers but rather the bowl is utilized to open and hold door assembly 74 in its open position. Thus, less spillage of comestibles occurs.

Further, the arcuate shape of portion 92 is advantageous in assisting in the minimization of the misuse of door assembly 74. Specifically, prior dispensers including pusher tongues on their door assembly had planar tongues with individuals often erroneously placing the tongue within or behind the bowl causing the comestible to be improperly dispensed and often spilled. Due to the arcuate shape of tongue 88 and its close vicinity to base 94, bowls can not be placed with tongue 88 inside of the bowl and there is substantially less likelihood that an individual would attempt to place the bowl behind tongue 88.

It should be appreciated that the distance that the comestible drops from the discharge opening of housing 36 into the bowl is an important feature. If this distance is too great or in other words if the discharge opening is too high above the bowl, the comestibles drops too much and develops excessive momentum causing it to bounce out of the bowls, especially for puffed products. On the other hand, if this distance is too small, then there is insufficient clearing distance to be able to insert and remove the bowl especially if filled with cereal. The position of the discharge opening of housing 36 above base 94 and thus the distance that the comestible drops into the bowl is therefore dependent upon the height of support legs 96. For comestibles in the form of ready-to-eat cereals, the distance of the discharge opening of housing 36 above base 94 is in the range of 10 to 13 centimeters.

Dispenser 10 according to the preferred teachings of the present invention is particularly advantageous for dispensing comestibles in the form of ready-to-eat cereals of whatever form and minimizes the generation of fines due to product breakage and rough handling and in particular of less than 1% of the total product dispensed.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

We claim:

1. Dispenser for comestibles comprising, in combination: a dispenser unit having a bottom including a discharge opening; a door pivotably mounted to the dispenser unit about an axis, with the door having a shape and size for closing the discharge opening in a closed position; and a counterweight fixed to the door without relative movement, located on the opposite side of the axis than the discharge opening, and extending from the door at an angle at least equal to and preferably greater than 90°, with the counterweight biasing the door to pivot about the axis to the closed position.

2. The dispenser of claim 1 wherein the counterweight is fixed to the door to abut with the bottom of the dispensing unit outside of the discharge opening to prevent the door from pivoting about the axis therebeyond.

3. The dispenser of claim 2 further comprising, in combination: a pusher tongue fixed to and extending from the door on the opposite side of the axis than the counterweight.

4. The dispenser of claim 3 wherein the pusher tongue includes a free end opposite to the door, with the pusher tongue adjacent the free end extending in a direction away from the door but towards the axis.

5. The dispenser of claim 4 wherein the pusher tongue includes an arcuate portion including the free end.

6. The dispenser of claim 5 further comprising, in combination: a stand including a base and a support extending between the base and the dispenser, with the base including an arcuate groove, with the free end of the pusher tongue moving through the arcuate groove when the door is pivoted about the axis.

7. The dispenser of claim 3 further comprising, in combination: a stand including a base and a support extending between the base and the dispenser, with the base including an arcuate groove, with the pusher tongue including a free end opposite to the door, with the free end of the pusher tongue moving through the arcuate groove when the door is pivoted about the axis.

8. Storage bin for comestibles comprising, in combination: a front wall having first and second sides, a lower edge and an upper edge; a back wall including first and second sides, a lower edge and an upper edge; first and second side walls extending between the first and second sides of the front and back walls; and a bottom extending between the lower edges of the side walls and extending from the front wall towards but spaced from the back wall, with a lower aperture located between the bottom and the back wall, with the bottom having a continuously decreasing vertical spacing from the lower aperture as the bottom extends from the front wall towards the back wall to assist in preventing bridging of the comestibles in the storage bin over the lower aperture, with the bottom including a first, generally linear portion extending from the front wall and a second, curvilinear portion extending from the linear portion downwardly and rearwardly to the lower aperture.

9. The storage bin of claim 8 wherein the back wall within the vertical extent of the bottom includes a portion having a continuously increasing horizontal offset from the lower aperture.

10. The storage bin of claim 9 wherein the portion of the back wall has a linear slope.

11. Dispenser for comestibles comprising, in combination: a dispenser unit having a front wall, a back wall and a trough extending from the back wall towards but spaced from the front wall, with a discharge opening being defined between the trough and the front wall, with the trough being sloped from the horizontal at an angle in the order of 1° to 3° from the discharge opening to the back wall; a storage bin including a lower opening for discharging the comestibles into the trough adjacent the back wall; and an auger including a shaft and a flight of the continuous screw type, with the flight having an outer periphery, with the auger rotatably mounted relative to the front and back walls with the outer periphery of the flight engaging the trough, with the outer periphery of the flight having a decreasing diameter from the front wall to the back wall.

12. The dispenser of claim 11 wherein the outer periphery of the flight decreases at an angle in the order of 2.5° from the front wall to the back wall.

13. Dispenser for comestibles comprising, in combination: a dispenser unit having a bottom including a discharge opening; a door pivotably mounted to the dispenser unit about an axis, with the door having a shape and size for closing the discharge opening in a closed position; means for biasing the door to pivot about the axis to the closed position; and a pusher tongue fixed to and extending from the door on the same side of the axis as the discharge opening, with the pusher tongue including a free end opposite to the door, with the pusher tongue adjacent the free end extending in a direction away from the door but towards the axis.

14. The dispenser of claim 13 wherein the pusher tongue includes an arcuate portion including the free end.

15. The dispenser of claim 13 further comprising, in combination: a stand including a base and a support extending between the base and the dispenser, with the base including an arcuate groove, with the free end of the pusher tongue moving through the arcuate groove when the door is pivoted about the axis.

16. Dispenser for comestibles comprising, in combination: a dispenser unit having a bottom including a discharge opening; a door pivotably mounted to the dispenser unit about an axis, with the door having a shape and size for closing the discharge opening in a closed position; means for biasing the door to pivot about the axis to the closed position; a pusher tongue fixed to and extending from the door on the same side of the axis as the discharge opening; and a stand including a base and a support extending between the base and the dispenser, with the base including an arcuate groove, with the pusher tongue including a free end opposite to the door, with the free end of the pusher tongue moving through the arcuate groove when the door is pivoted about the axis.

17. Dispenser for comestibles comprising, in combination: a dispenser unit having a front wall, a back wall and a trough extending from the back wall towards but spaced from the front wall, with a discharge opening being defined between the trough and the front wall, with the trough being sloped from the horizontal at an angle in the order of 1° to 3° from the discharge opening to the back wall; a storage bin including a front wall having first and second sides, a lower edge and an upper edge, a back wall including first and second sides, a lower edge and an upper edge, first and second side walls extending between the first and second sides of the front and back walls, and a bottom extending between the lower edges of the side walls and extending from the front wall towards but spaced from the back wall, with a lower aperture located between the bottom and the back wall, with the bottom having a continuously decreasing vertical spacing from the lower aperture as the bottom extends from the front wall towards the back wall to assist in preventing bridging of the comestibles in the storage bin over the lower aperture, with the lower opening discharging the comestibles into the trough adjacent the back wall; an auger including a shaft and a flight of the continuous screw type, with the flight having an outer periphery, with the auger rotatably mounted relative to the front and back walls with the outer periphery of the flight engaging the trough, with the outer periphery of the flight having a decreasing diameter from the front wall to the back wall; a door pivotably mounted to the dispenser unit about an axis, with the door having a shape and size for closing the discharge opening in a closed position; a counterweight fixed to the door without relative movement, located on the opposite side of the axis than the discharge opening, and extending from the door at an angle at least equal to and preferably greater than 90°, with the counterweight biasing the door to pivot about the axis to the closed position; a pusher tongue fixed to and extending from the door on the opposite side of the axis than the counterweight, with the pusher tongue including a free end opposite to the door, with the pusher tongue adjacent the free end extending in a direction away from the door but towards the axis; and a stand including a base and a support extending between the base and the dispenser, with the base including an arcuate groove, with the free end of the pusher tongue moving through the arcuate groove when the door is pivoted about the axis.

* * * * *